United States Patent
Branets et al.

(10) Patent No.: US 10,319,143 B2
(45) Date of Patent: Jun. 11, 2019

(54) VOLUMETRIC GRID GENERATION IN A DOMAIN WITH HETEROGENEOUS MATERIAL PROPERTIES

(71) Applicants: Larisa V. Branets, Conroe, TX (US); Valeriy Kubyak, Alpharetta, GA (US); Elena Kartasheva, Alpharetta, GA (US); Valeriy Shmyrov, Alpharetta, GA (US); Olga Kroshkina, Seattle, WA (US); Dmitry Kandybor, Alpharetta, GA (US); Xiao-Hui Wu, Sugar Land, TX (US)

(72) Inventors: Larisa V. Branets, Conroe, TX (US); Valeriy Kubyak, Alpharetta, GA (US); Elena Kartasheva, Alpharetta, GA (US); Valeriy Shmyrov, Alpharetta, GA (US); Olga Kroshkina, Seattle, WA (US); Dmitry Kandybor, Alpharetta, GA (US); Xiao-Hui Wu, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 7 days.

(21) Appl. No.: 14/807,748

(22) Filed: Jul. 23, 2015

(65) Prior Publication Data
US 2016/0035130 A1 Feb. 4, 2016

Related U.S. Application Data

(60) Provisional application No. 62/031,097, filed on Jul. 30, 2014.

(51) Int. Cl.
*G06T 17/05* (2011.01)
*G01V 99/00* (2009.01)
*G06T 17/20* (2006.01)

(52) U.S. Cl.
CPC ............ *G06T 17/05* (2013.01); *G01V 99/005* (2013.01); *G06T 17/20* (2013.01)

(58) Field of Classification Search
None
See application file for complete search history.

(56) References Cited

U.S. PATENT DOCUMENTS

| 5,537,320 A | 7/1996 | Simpson et al. |
| 5,671,136 A | 9/1997 | Willhoit, Jr. |

(Continued)

FOREIGN PATENT DOCUMENTS

| EP | 0 742 923 | 4/2000 |
| EP | 1 865 343 | 12/2007 |

(Continued)

OTHER PUBLICATIONS

U.S. Appl. No. 62/073,465, filed Oct. 31, 2014, Linfeng et al.

(Continued)

*Primary Examiner* — Said Broome
(74) *Attorney, Agent, or Firm* — ExxonMobil Upstream Research Company-Law Department

(57) ABSTRACT

Method for generating a 3D grid, and for defining a material property model on the grid, to use, for example, in a reservoir simulator. A mapping is defined (61,71) to a design space in which the material property is described as a piecewise smooth implicit or explicit function in three dimensions. Grid geometry is constructed only in the physical space of the model (62-65, 73-76), and no grid is required in the design space. The material property, for example permeability, is sampled in the design space (66,77) to populate the cells in the grid constructed in the physical domain. Prismatic grid cells may be truncated based on faults and horizons (65), or maybe be conformed to fault surfaces using a 3D parameterization of the model (76).

(Continued)

Only forward mapping, i.e. from the physical domain to the design space, is required.

21 Claims, 6 Drawing Sheets

(56) References Cited

U.S. PATENT DOCUMENTS

| | | | |
|---|---|---|---|
| 5,706,194 A | 1/1998 | Neff et al. |
| 5,710,726 A | 1/1998 | Rowney et al. |
| 5,747,673 A | 5/1998 | Ungerer et al. |
| 5,838,634 A | 11/1998 | Jones et al. |
| 5,844,799 A | 12/1998 | Joseph et al. |
| 5,953,680 A | 9/1999 | Divies et al. |
| 5,982,707 A * | 11/1999 | Abbott ............... G01V 1/301 367/38 |
| 5,992,519 A | 11/1999 | Ramakrishnan et al. |
| 6,014,343 A | 1/2000 | Graf et al. |
| 6,018,498 A | 1/2000 | Neff et al. |
| 6,052,529 A | 4/2000 | Watts, III |
| 6,106,561 A | 8/2000 | Farmer |
| 6,128,577 A | 10/2000 | Assa et al. |
| 6,128,579 A | 10/2000 | McCormack et al. |
| 6,138,076 A | 10/2000 | Graf et al. |
| 6,230,101 B1 | 5/2001 | Wallis |
| 6,300,958 B1 | 10/2001 | Mallet |
| 6,370,491 B1 | 4/2002 | Malthe-Sorenssen et al. |
| 6,374,185 B1 | 4/2002 | Taner et al. |
| 6,480,790 B1 | 11/2002 | Calvert et al. |
| 6,549,854 B1 | 4/2003 | Malinverno et al. |
| 6,597,995 B1 | 7/2003 | Cornu et al. |
| 6,662,146 B1 | 12/2003 | Watts |
| 6,664,961 B2 | 12/2003 | Ray et al. |
| 6,823,296 B2 | 11/2004 | Rey-Fabret et al. |
| 6,823,297 B2 | 11/2004 | Jenny et al. |
| 6,826,483 B1 | 11/2004 | Anderson et al. |
| 6,826,520 B1 | 11/2004 | Khan et al. |
| 6,826,521 B1 | 11/2004 | Hess et al. |
| 6,839,632 B2 | 1/2005 | Grace |
| 6,901,391 B2 | 5/2005 | Storm, Jr. et al. |
| 6,940,507 B2 | 9/2005 | Repin et al. |
| 6,941,255 B2 * | 9/2005 | Kennon ............... G01V 11/00 345/419 |
| 6,980,940 B1 | 12/2005 | Gurpinar et al. |
| 6,987,878 B2 | 1/2006 | Lees et al. |
| 7,031,891 B2 | 4/2006 | Malthe-Sorenssen et al. |
| 7,043,367 B2 | 5/2006 | Granjeon |
| 7,043,410 B2 | 5/2006 | Malthe-Sorenssen et al. |
| 7,069,149 B2 | 6/2006 | Goff et al. |
| 7,089,166 B2 | 8/2006 | Malthe-Sorenssen et al. |
| 7,096,122 B2 | 8/2006 | Han |
| 7,096,172 B2 | 8/2006 | Colvin et al. |
| 7,177,787 B2 | 2/2007 | Rey-Fabret et al. |
| 7,191,071 B2 | 3/2007 | Kfoury et al. |
| 7,254,091 B1 | 8/2007 | Gunning et al. |
| 7,277,796 B2 | 10/2007 | Kuchuk et al. |
| 7,280,952 B2 | 10/2007 | Butler et al. |
| 7,286,972 B2 | 10/2007 | Maker |
| 7,363,163 B2 | 4/2008 | Le Ra Valec-Dupin et al. |
| 7,369,980 B2 | 5/2008 | Deffenbaugh et al. |
| 7,376,539 B2 | 5/2008 | Lecomte |
| 7,379,853 B2 | 5/2008 | Middya |
| 7,379,854 B2 | 5/2008 | Calvert et al. |
| 7,406,878 B2 | 8/2008 | Rieder et al. |
| 7,412,363 B2 | 8/2008 | Callegari |
| 7,415,401 B2 | 8/2008 | Calvert et al. |
| 7,424,415 B2 | 9/2008 | Vaissiler |
| 7,433,786 B2 | 10/2008 | Adams |
| 7,451,066 B2 | 11/2008 | Edwards et al. |
| 7,467,044 B2 | 12/2008 | Tran et al. |
| 7,474,415 B2 | 1/2009 | Lin et al. |
| 7,478,024 B2 | 1/2009 | Gurpinar et al. |
| 7,480,205 B2 | 1/2009 | Wei |
| 7,486,589 B2 | 2/2009 | Lee et al. |
| 7,516,056 B2 | 4/2009 | Wallis et al. |
| 7,523,024 B2 | 4/2009 | Endres et al. |
| 7,526,418 B2 | 4/2009 | Pita et al. |
| 7,539,625 B2 | 5/2009 | Klumpen et al. |
| 7,542,037 B2 | 6/2009 | Fremming |
| 7,546,229 B2 | 6/2009 | Jenny et al. |
| 7,548,840 B2 | 6/2009 | Saaf |
| 7,577,527 B2 | 8/2009 | Velasquez |
| 7,584,081 B2 | 9/2009 | Wen et al. |
| 7,596,056 B2 | 9/2009 | Keskes et al. |
| 7,596,481 B2 | 9/2009 | Zamora et al. |
| 7,603,265 B2 | 10/2009 | Mainguy et al. |
| 7,606,691 B2 | 10/2009 | Calvert et al. |
| 7,617,082 B2 | 11/2009 | Childs et al. |
| 7,620,800 B2 | 11/2009 | Huppenthal et al. |
| 7,623,996 B1 | 11/2009 | Beyer |
| 7,640,149 B2 | 12/2009 | Rowan et al. |
| 7,657,494 B2 | 2/2010 | Wilkinson et al. |
| 7,672,825 B2 | 3/2010 | Brouwer et al. |
| 7,684,929 B2 | 3/2010 | Prange et al. |
| 7,706,981 B2 | 4/2010 | Wilkinson et al. |
| 7,711,532 B2 | 5/2010 | Dulac et al. |
| 7,716,029 B2 | 5/2010 | Couet et al. |
| 7,771,532 B2 | 5/2010 | Dulac et al. |
| 7,739,089 B2 | 6/2010 | Gurpinar et al. |
| 7,752,023 B2 | 7/2010 | Middya |
| 7,756,694 B2 | 7/2010 | Graf et al. |
| 7,783,462 B2 | 8/2010 | Landis, Jr. et al. |
| 7,796,469 B2 | 9/2010 | Keskes et al. |
| 7,809,537 B2 | 10/2010 | Hemanthkumar et al. |
| 7,809,538 B2 | 10/2010 | Thomas |
| 7,822,554 B2 | 10/2010 | Zuo et al. |
| 7,844,430 B2 | 11/2010 | Landis, Jr. et al. |
| 7,860,654 B2 | 12/2010 | Stone |
| 7,869,954 B2 | 1/2011 | Den Boer et al. |
| 7,877,246 B2 | 1/2011 | Moncorge et al. |
| 7,878,268 B2 | 2/2011 | Chapman et al. |
| 7,920,970 B2 | 4/2011 | Zuo et al. |
| 7,925,481 B2 | 4/2011 | Van Wagoner et al. |
| 7,932,904 B2 | 4/2011 | Branets et al. |
| 7,933,750 B2 | 4/2011 | Morton et al. |
| 7,953,585 B2 | 5/2011 | Gurpinar et al. |
| 7,970,593 B2 | 6/2011 | Roggero et al. |
| 7,986,319 B2 | 7/2011 | Dommisse et al. |
| 7,991,660 B2 | 8/2011 | Callegari |
| 7,996,154 B2 | 8/2011 | Zuo et al. |
| 8,005,658 B2 | 8/2011 | Tilke et al. |
| 8,050,892 B2 | 11/2011 | Hartman |
| 8,078,437 B2 | 12/2011 | Wu et al. |
| 8,095,345 B2 | 1/2012 | Hoversten |
| 8,095,349 B2 | 1/2012 | Kelkar et al. |
| 8,117,019 B2 | 2/2012 | Sun et al. |
| 8,145,464 B2 | 3/2012 | Arengaard et al. |
| 8,190,405 B2 | 5/2012 | Appleyard |
| 8,204,726 B2 | 6/2012 | Lee et al. |
| 8,204,727 B2 | 6/2012 | Dean et al. |
| 8,209,202 B2 | 6/2012 | Narayanan et al. |
| 8,212,814 B2 | 7/2012 | Branets et al. |
| 8,214,187 B2 * | 7/2012 | Mouton ............... G06T 17/20 702/12 |
| 8,234,073 B2 | 7/2012 | Pyrcz et al. |
| 8,249,842 B2 | 8/2012 | Ghorayeb et al. |
| 8,255,195 B2 | 8/2012 | Yogeswaren |
| 8,271,248 B2 | 9/2012 | Pomerantz et al. |
| 8,275,589 B2 | 9/2012 | Montaron et al. |
| 8,275,593 B2 | 9/2012 | Zhao |
| 8,280,635 B2 | 10/2012 | Ella et al. |
| 8,280,709 B2 | 10/2012 | Koutsabeloulis et al. |
| 8,285,532 B2 | 10/2012 | Zangl et al. |
| 8,301,426 B2 | 10/2012 | Abasov et al. |
| 8,301,429 B2 | 10/2012 | Hajibeygi et al. |
| 8,315,845 B2 | 11/2012 | Lepage |
| 8,339,395 B2 | 12/2012 | Williams et al. |
| 8,350,851 B2 | 1/2013 | Flew et al. |
| 8,355,898 B2 | 1/2013 | Pyrcz et al. |
| 8,359,184 B2 | 1/2013 | Massonnat |
| 8,359,185 B2 | 1/2013 | Pita et al. |
| 8,374,836 B2 | 2/2013 | Yogeswaren |
| 8,386,227 B2 | 2/2013 | Fung et al. |
| 8,401,832 B2 | 3/2013 | Ghorayeb et al. |

(56) References Cited

U.S. PATENT DOCUMENTS

| | | |
|---|---|---|
| 8,412,501 B2 | 4/2013 | Only et al. |
| 8,412,502 B2 | 4/2013 | Moncorge et al. |
| 8,423,338 B2 | 4/2013 | Ding et al. |
| 8,428,919 B2 | 4/2013 | Parashkevov |
| 8,429,671 B2 | 4/2013 | Wood et al. |
| 8,433,551 B2 | 4/2013 | Fung et al. |
| 8,437,999 B2 | 5/2013 | Pita et al. |
| 8,447,522 B2 | 5/2013 | Brooks |
| 8,447,525 B2 | 5/2013 | Pepper et al. |
| 8,452,580 B2 | 5/2013 | Strebelle |
| 8,457,940 B2 | 6/2013 | Xi et al. |
| 8,463,586 B2 | 6/2013 | Mezghani et al. |
| 8,484,004 B2 | 7/2013 | Schottle et al. |
| 8,489,375 B2 | 7/2013 | Omeragic et al. |
| 8,494,828 B2 | 7/2013 | Wu et al. |
| 8,498,852 B2 | 7/2013 | Xu et al. |
| 8,510,242 B2 | 8/2013 | Al-Fattah |
| 8,515,678 B2 | 8/2013 | Pepper et al. |
| 8,515,720 B2 | 8/2013 | Koutsabeloulis et al. |
| 8,515,721 B2 | 8/2013 | Morton et al. |
| 8,521,496 B2 | 8/2013 | Schottle et al. |
| 8,504,341 B2 | 9/2013 | Cullick et al. |
| 8,532,967 B2 | 9/2013 | Torrens et al. |
| 8,532,969 B2 | 9/2013 | Li et al. |
| 8,543,364 B2 | 9/2013 | Liu et al. |
| 8,577,660 B2 | 11/2013 | Wendt et al. |
| 8,583,411 B2 | 11/2013 | Fung |
| 8,589,135 B2 | 11/2013 | Middya et al. |
| 8,594,986 B2 | 11/2013 | Lunati |
| 8,599,643 B2 | 12/2013 | Pepper et al. |
| 8,606,524 B2 | 12/2013 | Soliman et al. |
| 8,606,555 B2 | 12/2013 | Pyrcz et al. |
| 8,612,194 B2 | 12/2013 | Horne et al. |
| 8,630,831 B2 | 1/2014 | Bratvedt et al. |
| 8,635,026 B2 | 1/2014 | Ameen |
| 8,639,444 B2 | 1/2014 | Pepper et al. |
| 8,655,632 B2 | 2/2014 | Moguchaya |
| 8,660,824 B2 * | 2/2014 | Williams ............. G01V 99/005 703/2 |
| 8,674,984 B2 * | 3/2014 | Ran ...................... G06T 17/205 345/419 |
| 8,676,557 B2 | 3/2014 | Ding et al. |
| 8,686,996 B2 | 4/2014 | Cheung et al. |
| 8,688,424 B2 | 4/2014 | Bourbiaux et al. |
| 8,694,261 B1 | 4/2014 | Robinson |
| 8,700,549 B2 | 4/2014 | Hossain et al. |
| 8,712,746 B2 | 4/2014 | Tillier et al. |
| 8,712,747 B2 | 4/2014 | Cullick et al. |
| 8,718,958 B2 | 5/2014 | Breton et al. |
| 8,718,993 B2 | 5/2014 | Klie |
| 8,731,887 B2 | 5/2014 | Hilliard et al. |
| 8,731,891 B2 | 5/2014 | Sung et al. |
| 8,738,294 B2 | 5/2014 | Ameen |
| 8,743,115 B1 * | 6/2014 | Mallet .................... G01V 1/302 345/419 |
| 8,762,442 B2 | 6/2014 | Jeong et al. |
| 8,775,141 B2 | 7/2014 | Raphael |
| 8,775,142 B2 | 7/2014 | Liu et al. |
| 8,776,895 B2 | 7/2014 | Li et al. |
| 8,780,671 B2 | 7/2014 | Sayers |
| 8,793,111 B2 | 7/2014 | Tilke et al. |
| 8,797,319 B2 | 8/2014 | Lin |
| 8,798,974 B1 | 8/2014 | Nunns |
| 8,798,977 B2 | 8/2014 | Hajibeygi et al. |
| 8,803,878 B2 | 8/2014 | Andersen et al. |
| 8,805,660 B2 | 8/2014 | Güyagüler et al. |
| 8,812,334 B2 | 8/2014 | Givens et al. |
| 8,818,778 B2 | 8/2014 | Salazar-Tio et al. |
| 8,818,780 B2 | 8/2014 | Calvert et al. |
| 8,825,461 B2 | 9/2014 | Sun et al. |
| 8,843,353 B2 | 9/2014 | Posamentier et al. |
| 8,855,986 B2 | 10/2014 | Castellini et al. |
| 8,862,450 B2 | 10/2014 | Derfoul et al. |
| 8,874,804 B2 | 10/2014 | AlShaikh et al. |
| 8,898,017 B2 | 11/2014 | Kragas et al. |
| 8,903,694 B2 | 12/2014 | Wallis et al. |
| 8,922,558 B2 | 12/2014 | Page et al. |
| 8,935,141 B2 | 1/2015 | Ran et al. |
| 9,058,445 B2 | 6/2015 | Usadi et al. |
| 9,187,984 B2 | 11/2015 | Usadi et al. |
| 2002/0049575 A1 | 4/2002 | Jalali et al. |
| 2005/0171700 A1 | 8/2005 | Dean |
| 2006/0122780 A1 | 6/2006 | Cohen et al. |
| 2006/0269139 A1 | 11/2006 | Keskes et al. |
| 2007/0016389 A1 | 1/2007 | Ozgen |
| 2007/0277115 A1 | 11/2007 | Glinsky et al. |
| 2007/0279429 A1 | 12/2007 | Ganzer et al. |
| 2008/0021684 A1 | 1/2008 | Dulac et al. |
| 2008/0126168 A1 | 5/2008 | Carney et al. |
| 2008/0133550 A1 | 6/2008 | Orangi et al. |
| 2008/0144903 A1 | 6/2008 | Wang et al. |
| 2008/0234988 A1 | 9/2008 | Chen et al. |
| 2008/0306803 A1 | 12/2008 | Vaal et al. |
| 2009/0071239 A1 | 3/2009 | Rojas et al. |
| 2009/0122061 A1 | 5/2009 | Hammon, III |
| 2009/0128556 A1 | 5/2009 | Fischer et al. |
| 2009/0248373 A1 | 10/2009 | Druskin et al. |
| 2009/0306945 A1 | 12/2009 | Wu et al. |
| 2010/0132450 A1 | 6/2010 | Pomerantz et al. |
| 2010/0138196 A1 | 6/2010 | Hui et al. |
| 2010/0161300 A1 | 6/2010 | Yeten et al. |
| 2010/0179797 A1 | 7/2010 | Cullick et al. |
| 2010/0185428 A1 | 7/2010 | Vink |
| 2010/0191516 A1 | 7/2010 | Benish et al. |
| 2010/0312535 A1 | 12/2010 | Chen et al. |
| 2010/0324873 A1 | 12/2010 | Cameron |
| 2011/0004447 A1 | 1/2011 | Hurley et al. |
| 2011/0015910 A1 | 1/2011 | Ran et al. |
| 2011/0054869 A1 | 3/2011 | Li et al. |
| 2011/0115787 A1 | 5/2011 | Kadlec |
| 2011/0161133 A1 | 6/2011 | Staveley et al. |
| 2011/0310101 A1 | 12/2011 | Prange et al. |
| 2012/0006560 A1 | 1/2012 | Calvert et al. |
| 2012/0059640 A1 | 3/2012 | Roy et al. |
| 2012/0065951 A1 | 3/2012 | Roy et al. |
| 2012/0143577 A1 | 6/2012 | Szyndel et al. |
| 2012/0158389 A1 | 6/2012 | Wu et al. |
| 2012/0159124 A1 | 6/2012 | Hu et al. |
| 2012/0215512 A1 | 8/2012 | Sarma |
| 2012/0215513 A1 * | 8/2012 | Branets ................ G01V 99/005 703/10 |
| 2012/0232799 A1 | 9/2012 | Zuo et al. |
| 2012/0232859 A1 | 9/2012 | Pomerantz et al. |
| 2012/0232861 A1 | 9/2012 | Lu et al. |
| 2012/0232865 A1 | 9/2012 | Maucec et al. |
| 2012/0265512 A1 | 10/2012 | Hu et al. |
| 2012/0271609 A1 | 10/2012 | Laake et al. |
| 2012/0296617 A1 | 11/2012 | Zuo et al. |
| 2013/0030782 A1 | 1/2013 | Yogeswaren |
| 2013/0035913 A1 | 2/2013 | Mishev et al. |
| 2013/0041633 A1 | 2/2013 | Hoteit |
| 2013/0046524 A1 | 2/2013 | Gathogo et al. |
| 2013/0073268 A1 | 3/2013 | Abacioglu et al. |
| 2013/0080128 A1 | 3/2013 | Yang et al. |
| 2013/0085730 A1 | 4/2013 | Shaw et al. |
| 2013/0090907 A1 | 4/2013 | Maliassov |
| 2013/0096898 A1 | 4/2013 | Usadi et al. |
| 2013/0096899 A1 | 4/2013 | Usadi et al. |
| 2013/0096900 A1 | 4/2013 | Usadi et al. |
| 2013/0110484 A1 | 5/2013 | Hu et al. |
| 2013/0112406 A1 | 5/2013 | Zuo et al. |
| 2013/0116993 A1 | 5/2013 | Maliassov |
| 2013/0124097 A1 | 5/2013 | Thorne |
| 2013/0124161 A1 | 5/2013 | Poudret et al. |
| 2013/0124173 A1 | 5/2013 | Lu et al. |
| 2013/0138412 A1 | 5/2013 | Shi et al. |
| 2013/0151159 A1 | 6/2013 | Pomerantz et al. |
| 2013/0179080 A1 | 7/2013 | Skalinski et al. |
| 2013/0185033 A1 | 7/2013 | Tompkins et al. |
| 2013/0204922 A1 | 8/2013 | El-Bakry et al. |
| 2013/0218539 A1 | 8/2013 | Souche |
| 2013/0231907 A1 | 9/2013 | Yang et al. |
| 2013/0231910 A1 | 9/2013 | Kumar et al. |
| 2013/0245949 A1 | 9/2013 | Abitrabi et al. |

(56) References Cited

U.S. PATENT DOCUMENTS

| | | | |
|---|---|---|---|
| 2013/0246031 A1* | 9/2013 | Wu | G06F 17/5009 703/10 |
| 2013/0289961 A1 | 10/2013 | Ray et al. | |
| 2013/0289962 A1 | 10/2013 | Wendt et al. | |
| 2013/0304679 A1 | 11/2013 | Fleming et al. | |
| 2013/0311151 A1 | 11/2013 | Plessix | |
| 2013/0312481 A1 | 11/2013 | Pelletier et al. | |
| 2013/0332125 A1 | 12/2013 | Suter et al. | |
| 2013/0338985 A1 | 12/2013 | Garcia et al. | |
| 2014/0012557 A1 | 1/2014 | Tarman et al. | |
| 2014/0136158 A1 | 5/2014 | Hegazy et al. | |
| 2014/0136171 A1 | 5/2014 | Sword, Jr. et al. | |
| 2014/0166280 A1 | 6/2014 | Stone et al. | |
| 2014/0201450 A1 | 7/2014 | Haugen | |
| 2014/0214388 A1 | 7/2014 | Gorell | |
| 2014/0222342 A1 | 8/2014 | Robinson | |
| 2014/0236558 A1 | 8/2014 | Maliassov | |
| 2014/0278298 A1 | 9/2014 | Maerten | |
| 2014/0330547 A1 | 11/2014 | Calvert et al. | |
| 2015/0073763 A1 | 3/2015 | Wang et al. | |
| 2015/0120199 A1 | 4/2015 | Casey | |
| 2015/0136962 A1 | 5/2015 | Pomerantz | |
| 2015/0205001 A1 | 7/2015 | Carruthers et al. | |
| 2015/0212232 A1 | 7/2015 | Perkins et al. | |
| 2015/0293260 A1 | 10/2015 | Ghayour et al. | |
| 2016/0011328 A1 | 1/2016 | Jones et al. | |
| 2016/0035130 A1 | 2/2016 | Branets et al. | |
| 2016/0041279 A1 | 2/2016 | Casey | |
| 2016/0124113 A1 | 5/2016 | Bi et al. | |
| 2016/0124117 A1 | 5/2016 | Huang et al. | |
| 2016/0125555 A1 | 5/2016 | Branets et al. | |
| 2016/0245951 A1 | 8/2016 | Kartasheva et al. | |

FOREIGN PATENT DOCUMENTS

| | | |
|---|---|---|
| EP | 1 653 411 | 7/2008 |
| EP | 1 707 993 | 8/2009 |
| WO | 1999/028767 | 6/1999 |
| WO | 2007/022289 | 2/2007 |
| WO | 2007/116008 | 10/2007 |
| WO | 2009/138290 | 11/2009 |
| WO | WO 2011/059535 | 5/2011 |
| WO | WO 2011/106135 | 9/2011 |
| WO | WO 2012/078217 | 6/2012 |
| WO | WO 2013/028234 | 2/2013 |
| WO | 2013/187915 | 12/2013 |
| WO | 2014/027196 | 2/2014 |
| WO | 2014/171947 | 10/2014 |
| WO | 2014/185950 | 11/2014 |
| WO | WO 2014/185898 | 11/2014 |

OTHER PUBLICATIONS

U.S. Appl. No. 62/081,159, filed Feb. 25, 2015, Kartasheva et al.
Kartasheva, E. et al., "Discretization of Functionally Based Heterogeneous Objects." SM '03, Seattle, Washington, Jun. 16-20, 2003, 12 pgs.
Chow, H.N. et al., "Re-designing Heterogeneous Objects by Attribute Discretization." *Computer-Aided Design & Applications* 2(1-4), 2005, pp. 387-392.
Mallison, B. et al., "Unstructured Cut-Cell Grids for Modeling Complex Reservoirs," SPE 163642, SPE Reservoir Simulation Symposium, The Woodlands, TX, Feb. 18-20, 2013, 17 pgs.
U.S. Appl. No. 62/120,653, filed Feb. 25, 2015, Kartasheva et al.
Byer, T.J., et al., (1998), "Preconditioned Newton Methods for Fully Coupled Reservoir and Surface Facility Models", *SPE 49001, 1998 SPE Annual Tech. Conf., and Exh.*, pp. 181-188.
Candes, E. J., et al., (2004), "New Tight Frames of Curvelets and Optimal Representations of Objects with $C^2$ Singularities," *Communications on Pure and Applied Mathematics 57*, pp. 219-266.
Chen, Y. et al. (2003), "A coupled local-global upscaling approach for simulating flow in highly heterogeneous formations", *Advances in Water Resources 26*, pp. 1041-1060.
Connolly, P., (1999), "Elastic Impedance," The Leading Edge 18, pp. 438-452.
Crotti, M.A. (2003), "Upscaling of Relative Permeability Curves for Reservoir Simulation: An Extension to Areal Simulations Based on Realistic Average Water Saturations", SPE 81038, SPE Latin American and Caribbean Petroleum Engineering Conf., 6 pgs.
Donoho, D. L., Hou, X., (2002), "Beamlets and Multiscale Image Analysis," *Multiscale and Multiresolution Methods, Lecture Notes in Computational Science and Engineering 20*, pp. 149-196.
Durlofsky, L.J. (1991), "Numerical Calculation of Equivalent Grid Block Permeability Tensors for Heterogeneous Porous Media", *Water Resources Research* 27(5), pp. 699-708.
Farmer, C.L. (2002), "Upscaling: a review", *Int'l. Journal for Numerical Methods in Fluids* 40, pp. 63-78.
Gai, X., et al., (2005), "A Timestepping Scheme for Coupled Reservoir Flow and Geomechanics in Nonmatching Grids", *SPE 97054, 2005 SPE Annual Tech. Conf. and Exh.*, pp. 1-11.
Haas, A., et al., (1994), "Geostatistical Inversion—A Sequential Method of Stochastic Reservoir Modeling Constrained by Seismic Data," *First Break 12*, pp. 561-569.
Haugen, K. B., et al., (2013), "Highly Optimized Phase Equilibrium Calculations", *SPE 163583*, pp. 1-9.
Holden, L. et al. (1992), "A Tensor Estimator for the Homogenization of Absolute Permeability", *Transport in Porous Media 8*, pp. 37-46.
Isaaks, E. H., et al., (1989), "Applied Geostatistics", *Oxford University Press*, New York, pp. 40-65.
Kurzak, J., et al., (2007), "Implementation of Mixed Precision in Solving Systems of Linear Equations on The Cell Processor", *Concurrency Computat.: Pract. Exper. 2007*, vol. 19, pp. 1371-1385.
Journel, A., (1992), "Geostatistics: Roadblocks and Challenges," *Geostatistics, Troia '92: Quanititative Geoglogy and Geostatistics 1*, pp. 213-224.
Klie, H., et al., (2005), "Krylov-Secant Methods for Accelerating The Solution of Fully Implicit Formulations", *SPE 92863, 2005 SPE Reservoir Simulation Symposium*, 9 pgs.
Mallat, S., (1999), "A Wavelet Tour of Signal Processing", *Academic Press*, San Diego, pp. 80-91.
Lu, B., et al., (2007), "Iteratively Coupled Reservoir Simulation for Multiphase Flow", *SPE 110114, 2007 SPE Annual Tech. Conf. and Exh.*, pp. 1-9.
Mosqueda, G., et al., (2007), "Combined Implicit or Explicit Integration Steps for Hybrid Simulation", *Earthquake Engng. & Struct. Dyn.*, vol. 36(15), pp. 2325-2343.
Strebelle, S., (2002), "Conditional simulations of complex geological structures using multiple-point statistics," *Mathematical Geology* 34(1), pp. 1-21.
Sweldens, W., (1998), "The Lifting Scheme: A Construction of Second Generation Wavelets," *SIAM Journal on Mathematical Analysis* 29, pp. 511-546.
Qi, D. et al. (2001), "An Improved Global Upscaling Approach for Reservoir Simulation", *Petroleum Science and Technology* 19(7 &8), pp. 779-795.
Verly, G., (1991), "Sequential Gaussian Simulation: A Monte Carlo Approach for Generating Models of Porosity and Permeability," Special Publication No. 3 of EAPG—Florence 1991 Conference, Ed.: Spencer, A.M, pp. 345-356.
Whitcombe, D. N., et al., (2002), "Extended elastic impedance for fluid and lithology prediction," *Geophysics 67*, pp. 63-67.
White, C.D. et al. (1987), "Computing Absolute Transmissibility in the Presence of Fine-Scale Heterogeneity", SPE 16011, $9^{th}$ SPE Symposium in Reservoir Simulation, pp. 209-220.
Wu, X.H. et al. (2007), "Reservoir Modeling with Global Scaleup", SPE 105237, $15^{th}$ SPE Middle East Oil & Gas Show & Conf., 13 pgs.
Yao, T., et al., (2004), "Spectral Component Geologic Modeling: A New Technology for Integrating Seismic Information at the Correct Scale," Geostatistics Banff, *Quantitative Geology & Geostatistics 14*, pp. 23-33.

(56) References Cited

OTHER PUBLICATIONS

Younis, R.M., et al., (2009), "Adaptively-Localized-Continuation-Newton: Reservoir Simulation Nonlinear Solvers That Converge All the Time", *SPE 119147, 2009 SPE Reservoir Simulation Symposium*, pp. 1-21.mos.

Zhang T., et al., (2006), "Filter-based classification of training image patterns for spatial Simulation," *Mathematical Geology 38*, pp. 63-80.

Aarnes, J. (2004), "Multiscale simulation of flow in heterogeneous oil-reservoirs", SINTEF ICT, Dept. of Applied Mathematics, 2 pgs.

Aarnes, J. et al. (2004), "Toward reservoir simulation on geological grid models", $9^{th}$ European Conf. on the Mathematics of Oil Recovery, 8 pgs.

Ahmadizadeh, M., et al., (2007), "Combined Implicit or Explicit Integration Steps for Hybrid Simulation", *Structural Engineering Research Frontiers*, pp. 1-16.

Bortoli, L. J., et al., (1992), "Constraining Stochastic Images to Seismic Data", Geostatistics, Troia, *Quantitative Geology and Geostatistics 1*, pp. 325-338.

\* cited by examiner

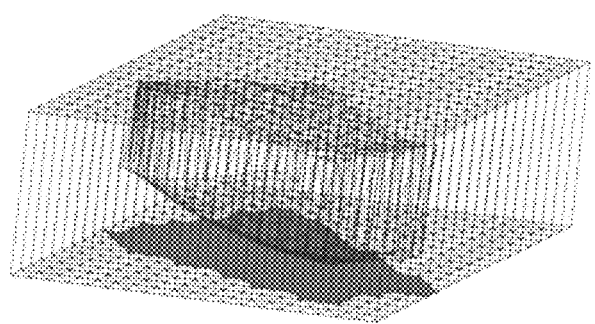
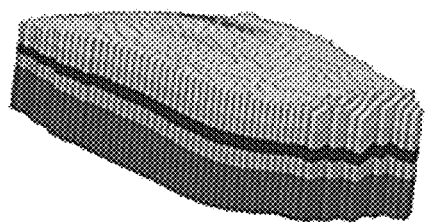
FIG. 2A  FIG. 2B
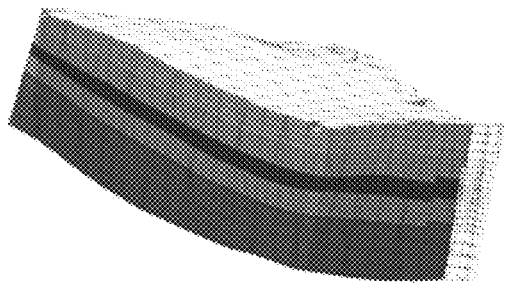
FIG. 2C
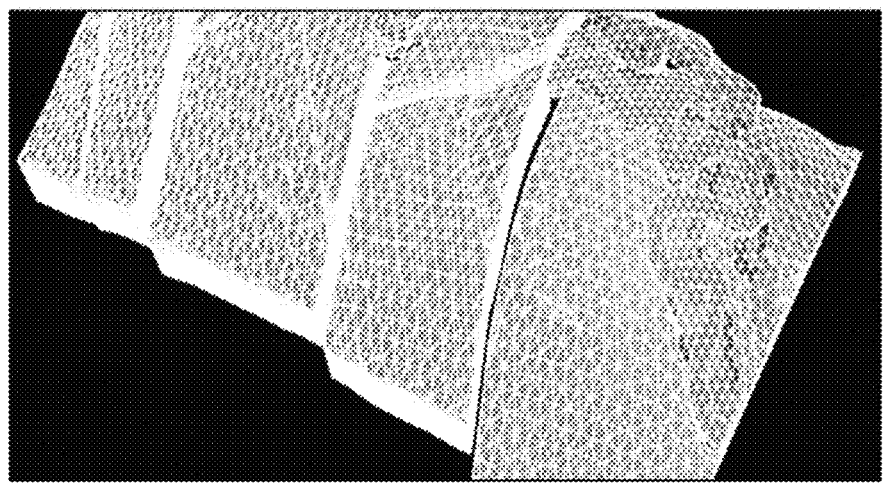
FIG. 3

VOLUMETRIC GRID GENERATION IN A DOMAIN WITH HETEROGENEOUS MATERIAL PROPERTIES

CROSS-REFERENCE TO RELATED APPLICATION

This application claims the benefit of U.S. Provisional Patent Application 62/031,097, filed Jul. 30, 2014, entitled VOLUMETRIC GRID GENERATION IN A DOMAIN WITH HETEROGENEOUS MATERIAL PROPERTIES, the entirety of which is incorporated by reference herein.

FIELD OF THE INVENTION

This disclosure relates generally to the field of hydrocarbon reservoir management or geophysical prospecting and, more particularly, to reservoir simulation. Specifically, the disclosure relates to a method for constructing a conceptual 3-D grid that is adapted to a subsurface region's material properties, where the grid may be used for reservoir simulation studies in reservoir exploration, development or production stages, as well as for representing a geologic model description of a reservoir structure and material properties. More specifically, the grid can carry a model of rock and fluid properties of a reservoir or can be used for numerical discretization of partial differential equations such as fluid flow or wave propagation.

BACKGROUND OF THE INVENTION

To create a model of the subsurface is to construct a discretized representation (volumetric grid) of a complex 3D domain which is adapted to the domain's material properties such as permeability. In general, the domain is comprised of multiple separate volumetric pieces which may come in partial contact with each other, thus, forming a non-manifold topology. The domain's material properties are described by a designer who can assign them to only one continuous volume at a time. Material properties are described as piecewise smooth implicit or explicit functions (e.g., piecewise constant) in 3D.

For example, in application to subsurface reservoir modeling, a 3D model domain is delineated by horizons and faults, where horizons are mostly flat horizontal surfaces related to deposition of sediment material forming a reservoir rock, and faults are discontinuities in the rock introduced by non-depositional events. For a modeler to provide a description of rock properties in the subsurface domain, it is necessary to work in a continuous "depositional" space (i.e., a design space) where all the faults have been removed. Rock properties then can be described with the help of globally continuous trend functions and/or mesh dependent functional representations in this continuous space. A volumetric grid in physical space that conforms to the rock properties is required to carry out modeling and flow simulation studies. For purposes of this application, a grid is the conceptual subdivision of a subsurface region into adjacent discrete cells for the purpose of specifying a numerical value for one or more material properties of the subsurface such as rock type, permeability or porosity for each cell.

Related publications dealing with the same or similar technical problem include "Unstructured Cut-Cell Grids for Modeling Complex Reservoirs," B. T. Mallison, C. Sword, T. Viard, W. J. Milliken, A. Cheng, SPE163642 (2013). The authors use GeoChron mapping, build a structured grid in a design space, and truncate it by images of fault surfaces, then map truncated cells back to real space and do complex post-processing on the fault surfaces. This approach is time consuming, and requires well-defined inverse mapping (back to real space) and complex geometric post-processing.

In US patent application publication US 2008/0021684 ("Method for building a three dimensional cellular partition of a geological domain," by J.-C. Dulac, J.-L. Mallet), the authors define "parametric" mapping to design space (GeoChron), voxelize real space and sample cell ID or layer ID from the design space (partitioned into "parametric" cells, i.e. a Cartesian grid). They do not define cell geometry or topology in real space but instead do post-processing on the aggregations of voxels with the same cell ID to use them as cells in a flow simulator. This avoids the complexity of building the 3D simulation mesh in real space, requires voxelization (which requires accuracy of the mapping and/or inverse mapping) and post-processing of voxels into simulation cells by deducing or approximating their geometric and topological relationships, none of which is straightforward.

U.S. Pat. No. 7,523,024 to Endres et al., "Modeling geologic objects in faulted formations," defines geological objects in real space (construct a geobody in design space, map it back to real space using inverse "paleo-transformation," and trim the portions that map outside). Their approach requires inverse mapping, and does not go all the way to grid generation.

Patent application publication No. WO2012/078217 to Wu et al. discloses mapping the physical domain to a continuous design space.

In summary, the main approach in the current advanced subsurface grid generation strategies is to define a two-way mapping to design space, build a volumetric grid in the design space, and populate it with properties, then map the grid geometry back to real space (as stair-step by Dulac et al. or as truncated by Mallison et al.). A more traditional approach is to define a grid in real space with standard layering methods (proportional, top- or bottom-conforming) without much regard for the property trends/shape of the geobodies, then map the grid to design space and populate it with properties.

SUMMARY OF THE INVENTION

In the present invention, a grid geometry is constructed only in the physical space of the model, and no grid is required in the design space (especially if the functional property definition in design space is grid-free, i.e. can be represented by one or more mathematical expressions). The benefit is greater flexibility in handling complex geometries and less strict requirements on the quality of the mapping to design space (only forward mapping is required, backward mapping can be ill-defined).

In one embodiment, the invention is a method for generating a model of a material property of a subsurface region for hydrocarbon prospecting or reservoir development, said method comprising: (a) generating, using a computer, a mapping from a physical domain of the subsurface region, with faults, to a continuous design space in which all faults are removed; (b) describing the material property in the continuous design space as a piecewise smooth implicit or explicit function in three dimensions; (c) in the physical domain, constructing grid layering from the function describing the material property, said constructing comprising generating a two-dimensional mesh and extruding it through the physical domain into the third dimension, building prismatic cell faces based on property contrasts, thereby subdividing the physical domain into prismatic grid cells, wherein the grid cells are truncated at faults, or the grid cells are conformed to fault surfaces using a parameterization of a 3D model domain, or a combination of both; (d) sampling the material property from the design space and populating the grid cells in the physical domain with material property values; (e) in the physical domain, identifying connectivity or each horizon across each fault by approaching the fault from both sides; and (f) using the model of the material property for hydrocarbon prospecting or reservoir development in the subsurface region.

BRIEF DESCRIPTION OF THE DRAWINGS

The advantages of the present invention are better understood by referring to the following detailed description and the attached drawings, in which:

FIGS. 2A-2C illustrate: (2A) Parallel rays for property sampling in one volume of the domain; (2B) Sampled property along the rays; and (2C) Grid resolving property contrasts;

FIG. 3 illustrates a truncated grid of a faulted reservoir showing consolidation between zones (connectivity across a horizon);

All drawings except FIGS. 1, 6 and 7 are black-and-white reproductions of colored originals due to patent law restrictions on the use of color.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
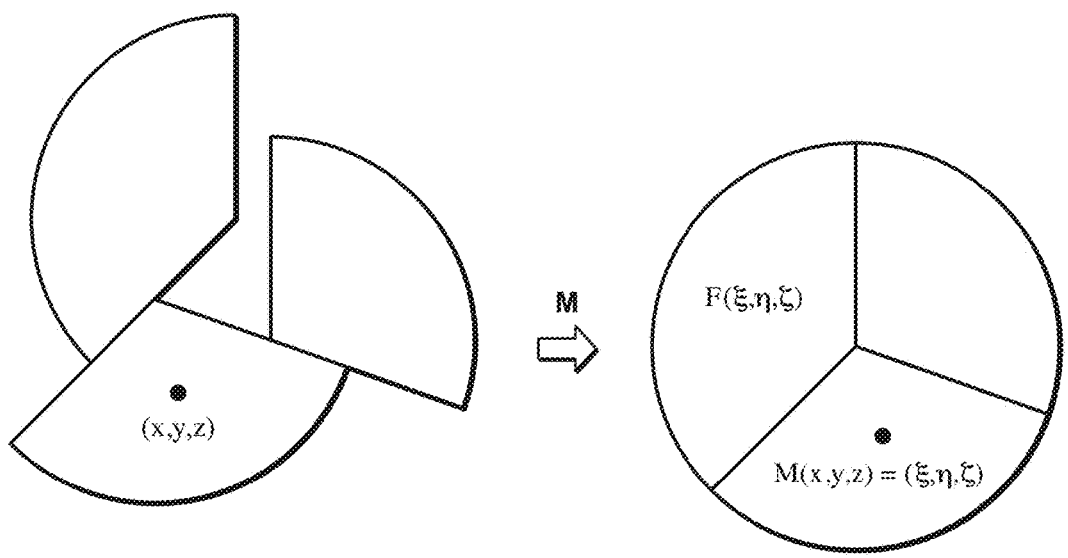
FIG. 1 is a schematic diagram illustrating a mapping M of a domain with discontinuities into a continuous design space where the designer defines material properties F.

Models of properties in a 3D domain are designed by, or under the control of, a human designer. To assist the property designer's work, the original domain is mapped to a design space where all the separate volumes are pieced together based on some suitable geometric criterion. FIG. 1 illustrates the mapping process in a schematic diagram. As a result of the designer's work, the description of some physical property exists only in the design space.

The grid of the original domain needs to be adapted to these volumetric properties, and material properties of the subsurface region need to be transferred onto this grid. Thus, the grid generation process includes a methodology for property sampling (through the mapping to the design space) and property feature reconstruction from this implicit definition of the material properties (composition of the mapping and functional property representation in the design space).

In the present invention, grid geometry is constructed only in the physical space of the model (as opposed to being built in a continuous space and mapped back to the physical space). The benefit is greater flexibility in handling complex geometries and reduction of tedious and non-intuitive geometric post-processing.

In more detail, the properties can be sampled along the sets of parallel rays which can be independent for different volumetric parts of the domain. The parallel rays for sampling the property are illustrated in FIG. 2A, and the sampled property along the rays is illustrated in FIG. 2B. The internal material structure is detected as the change in sampled properties. A grid is adapted to this structure by resolving surfaces of sharp property contrast with the cell faces; this is illustrated in FIG. 2C. The grid can also be adapted to properties with smoother value distribution by some grid optimization approach that adjusts cell sizes based on the property values.

Example Application: Gridding a Model of a Faulted Subsurface Reservoir

The present inventive method can be used to build a prismatic grid resolving layered media of a subsurface reservoir. The grid can be either truncated at the bounding surfaces or made to conform to the bounding surfaces of the 3D domain volumes, where the bounding surfaces are, for example, faults and horizons of a structural framework delineating volumes of a subsurface reservoir. In truncating a prismatic grid, the cells near the domain boundaries are truncated (or cut) by those bounding surfaces. In conforming a prismatic grid, the cells are constructed in such a manner that their faces always lie on (conform to) the domain boundaries. The grid can be used in modeling, e.g. of the fluid flow pathways through the reservoir. This use includes reservoir simulation studies in reservoir exploration, development or production stages, but the grid can also be used for any representation of a geologic model description of a reservoir structure and material properties.

Figure 6:
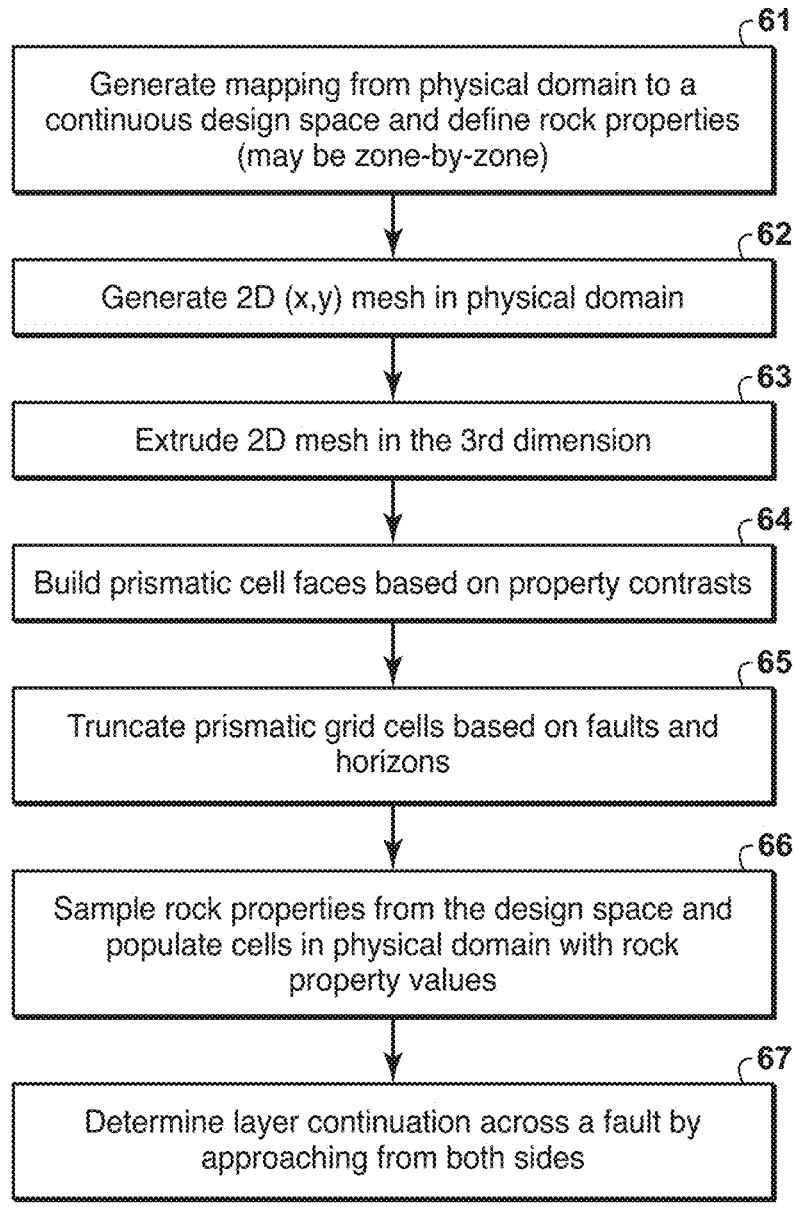
FIG. 6 is a flow chart showing basic steps in an embodiment of the present inventive method for generating a truncated grid.

Before the grid can be built, it is necessary to generate a mapping to a continuous design space using a known technique, e.g., companion U.S. patent application Ser. No. 62/073,465, entitled Methods to Handle Discontinuity in Constructing Design Space Using Moving Least Squares and companion U.S. patent application Ser. No. 62/081,159, entitled Handling Domain Discontinuity with the Help of Grid Optimization Techniques, and define geologic concept and rock properties in the design space where faults are removed and depositional layers are continuous (e.g., US patent application publication No. 2013/0246031). (These three references are incorporated herein in all jurisdictions that allow it.) This is shown as the first step (61 and 71) in each of the flow charts (FIGS. 6 and 7) for two different embodiments of the present inventive method. This can be done by a zone of the model, a zone being a volume between two horizons. Thus, grid geometry generation is repeated for each zone.

An advantage to the present inventive method is that the mapping strategy may be very simple and efficient because no reverse mapping (back to the functional domain) is required. The reverse mapping therefore can be ill-defined, for example two points in the physical domain may be mapped to the same point in the design space.

Figure 4A:
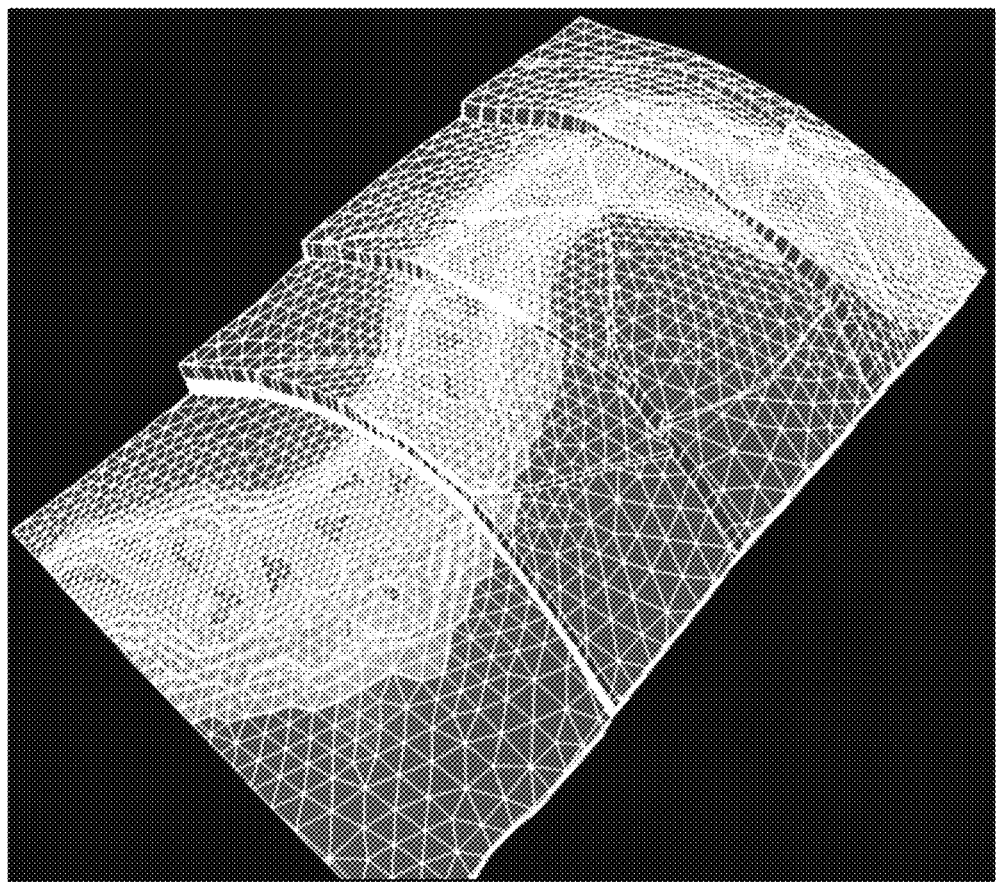
FIGS. 4A-4B illustrate a truncated grid of a faulted reservoir using: (4A) adaptive areal resolution; (4B) layers reconstructed from continuous design space.

The designer's work in each continuous design space corresponds to modeling a stratigraphic geologic concept, as described, e.g., in US patent application publication No. 2013/0246031, where the design space model of geologic concept contains a description of model regions and interfaces (surfaces) by means of mathematical functions. Generation of unstructured grids according to the present invention is discussed in more detail grid (for a zone or for the entire model volume) are as follows, with reference to the flow chart of FIG. 6:

Step 62: Generate a 2D mesh (in the physical domain) in an (x,y) plane of a bounding box around a volume part (fault block) or an entire model volume. The mesh can be adaptive to some property or density control, as is illustrated in FIG. 4A. The bounding box can be best fitted to the volume part or to the entire model (by defining rotation relative to an (x,y,z) coordinate system).

Step 63: Extrude the 2D mesh through the physical domain in the third dimension. The direction for mesh extrusion can be different for each volume part (or fault block). Even further, variable extrusion directions can be built, adapting to a property gradient.

Step 64: Build prismatic cell faces based on property contrasts. A property defining main zonation/layer ID of a geologic concept may be sampled from the design space and prismatic grid faces may be constructed on the (implicitly defined) layer boundaries. Layer definition and reconstruction can be hierarchical based on the geologic concept, i.e., if smaller-scale geobodies are modeled as fully contained inside a main zone of the concept model, they will be reconstructed in a hierarchical manner after the main zone is reconstructed. Optionally, grid layers may be further subdivided with the standard layering options (proportional, top- or bottom-conforming).

Step 65: Prismatic grid cells may be truncated by the boundaries of the volumetric pieces of the domain (faults and horizons). Steps 62-65 are performed entirely in the physical domain.

Figure 4B:
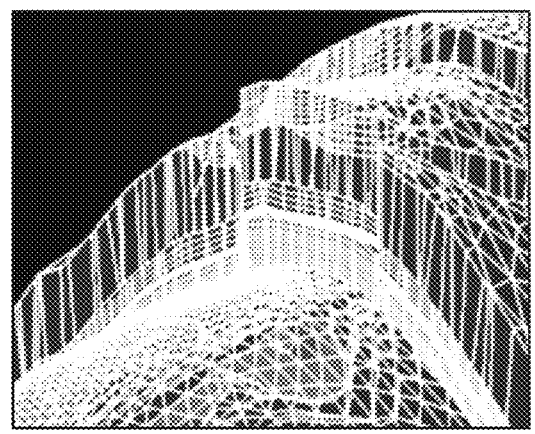

Step 66: Rock properties may be sampled onto the grid cells from the design space. This is illustrated in FIG. 4B. Various types of averaging can be used in sampling, e.g. cell center, arithmetic average of "vertical" edge centers, arithmetic or harmonic average of quadrature points.

Step 67: Connectivity of the cells along the contacts of volumetric domain pieces (faults) may be determined by computing intersections of cell faces coming from both sides of the contact.

Figure 7:
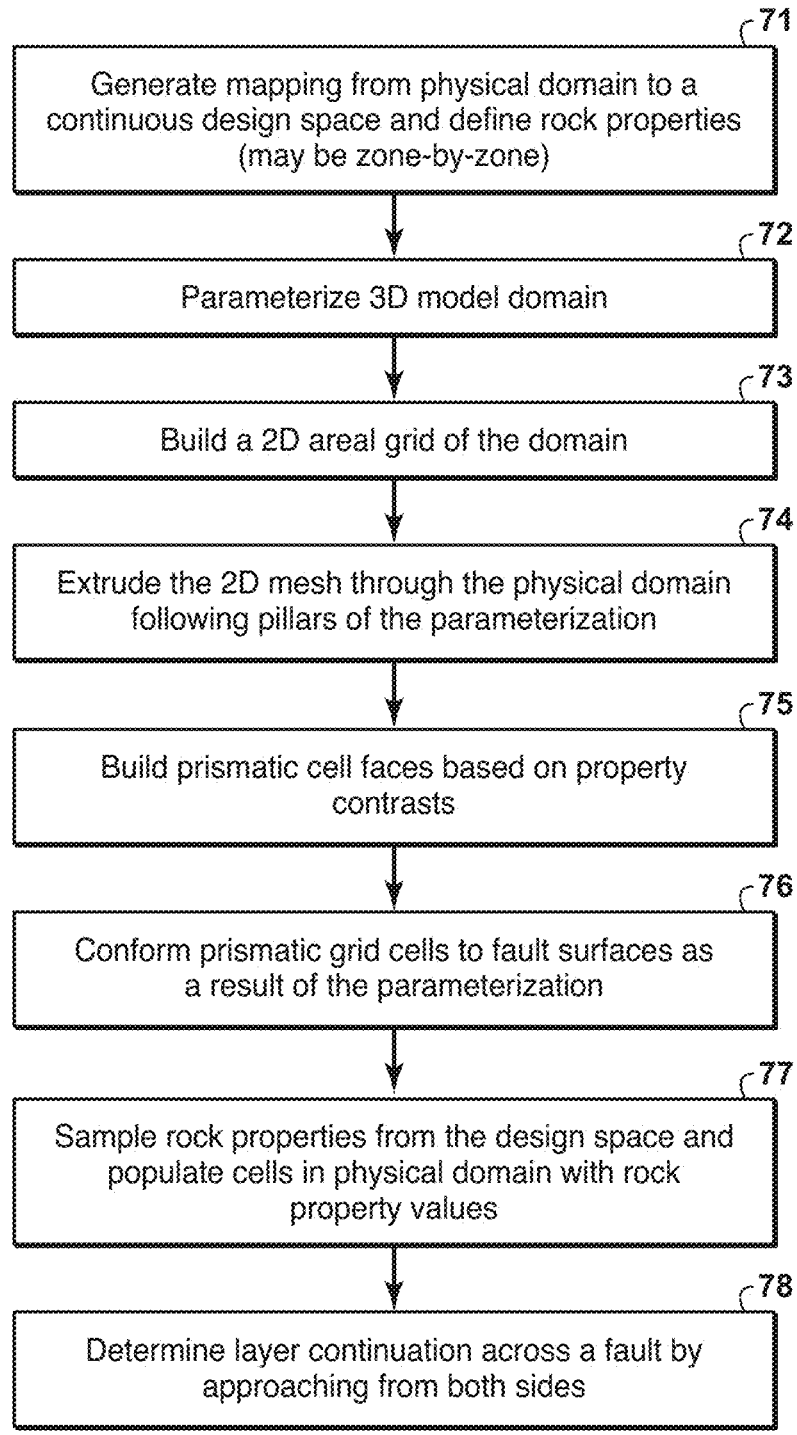
FIG. 7 is a flow chart showing basic steps in an embodiment of the present inventive method for generating a conforming prismatic grid.

Basic steps in an embodiment of the present inventive method for generating a conforming prismatic grid (for a zone, fault-block (volume bounded by fault surfaces and containing multiple zones) or entire model volume) are as follows, with reference to the flow chart of FIG. 7:

Step 72: Generate a 3D parameterization of a model domain (zone, fault-block, or entire model). This step is specific to building a conforming grid, and is not required for truncated grids. This step and steps 73-76 are performed totally in the physical domain. See, for example, companion patent application Ser. No. 62/120,653, entitled "Methodology for Parameterizing 3D Domain with Discontinuities", which is incorporated herein in all jurisdictions that allow it.

Figure 5A:
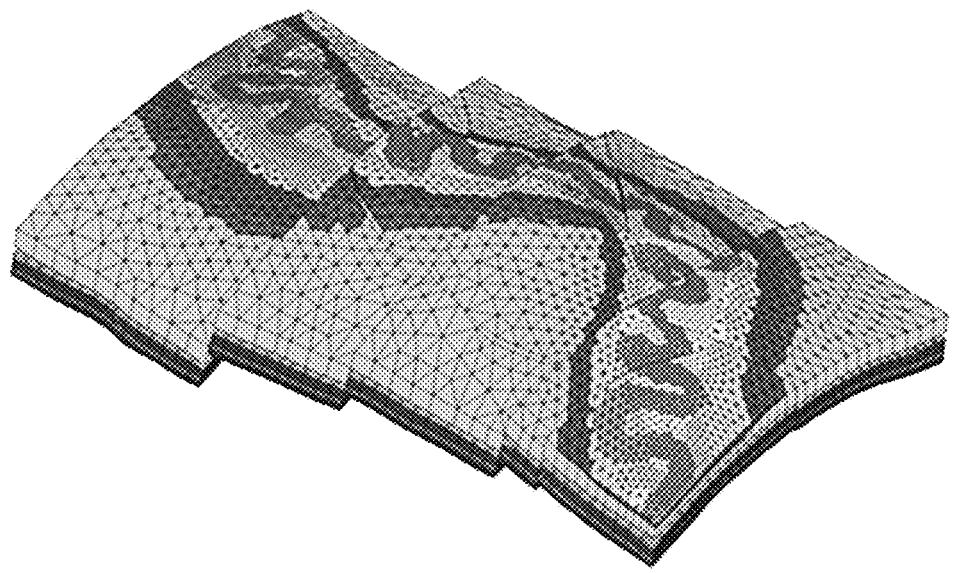
FIGS. 5A-5B illustrate a conformal prismatic grid of a faulted reservoir using: (5A) adaptive areal resolution; (5B) layers reconstructed from a continuous design space.

Step 73: Build a 2D areal grid of the domain (or, optionally, use the base grid of the parameterization). Use existing methods, such as is disclosed in U.S. Pat. No. 7,932,904, which is incorporated herein in all jurisdictions that allow it. The 2D mesh can be adaptive to some property or density control, as is illustrated in FIG. 5A.

Step 74: Extrude the 2D mesh through the physical domain in the third dimension according to the pillars of the parameterization.

Step 75: Build prismatic cell faces based on property contrasts. (same as in step 64 in FIG. 6). A property defining main zonation/layer ID of a geologic concept may be sampled from the design space and prismatic grid faces may be constructed on the (implicitly defined) layer boundaries. Layer definition and reconstruction can be hierarchical based on the geologic concept, i.e., if smaller-scale geobodies are modeled as fully contained inside a main zone of the concept model, they may be reconstructed in a hierarchical manner after the main zone is reconstructed. Optionally, grid layers may be further subdivided with the standard layering options (proportional, top- or bottom-conforming).

Step 76: Prismatic grid cells conform to fault surfaces as a result of the parameterization; they can be either (a) truncated by horizon surfaces or (b) conformed to (form a pinch-out with) horizons.

Figure 5B:
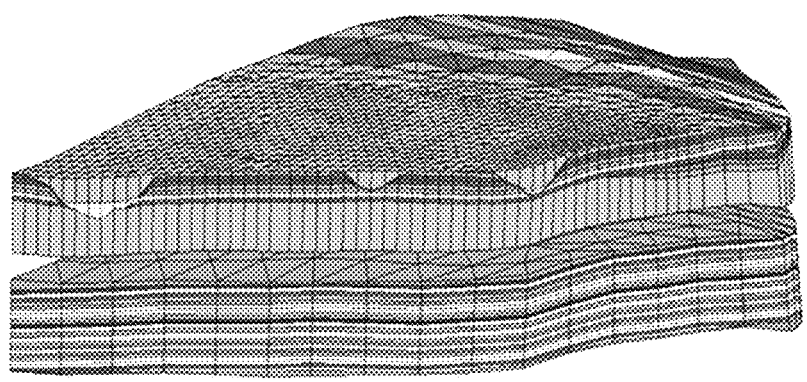

Step 77: Rock properties may be sampled onto the grid cells from the design space (same as step 66). This is illustrated in FIG. 5B. Various types of averaging can be used in sampling, e.g. cell center, arithmetic average of "vertical" edge centers, arithmetic or harmonic average of quadrature points.

Step 78: Connectivity of the cells along the contacts of volumetric domain pieces (faults) may be determined by computing intersections of cell faces coming from both sides of the contact. (same as step 67).

Conformal grids are preferable for reservoirs with near-vertical faults, and truncated grid are preferable for more complex reservoir structures that include, for example, x- or y-faults, or nearly horizontal faults.

For a multi-zonal model, which is built zone-by-zone with different areal 2D grid resolutions for each zone, a final step of consolidation needs to be performed after grid geometries are generated in each zone of the model. In this consolidation step, connectivity of cells along the contacts of zones (horizons and faults) is established similar to steps 67 and 78). This consolidation is illustrated for a truncated grid in FIG. 3.

As will be readily apparent to all persons who work in the technical field, all practical applications of the present inventive method are performed using a computer, programmed in accordance with the disclosures herein.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A method for generating a model of a material property of a subsurface region for hydrocarbon prospecting or reservoir development, said method comprising:
generating, using a computer, a mapping from a physical domain of the subsurface region, with faults, to a continuous design space in which all faults are removed;
describing the material property in the continuous design space as a piecewise smooth implicit or explicit function in three dimensions;
in the physical domain, constructing grid layering from the function describing the material property, the constructing comprising:

(i) generating a two-dimensional mesh in a two-dimensional plane of the physical domain;
(ii) extruding the two-dimensional mesh through the physical domain into the third dimension; and
(iii) building prismatic cell faces based on material property contrasts thereby subdividing the physical domain into prismatic grid cells, wherein the grid cells are truncated at faults, the grid cells are conformed to fault surfaces using a parameterization of a 3D model domain, or a combination of both;

sampling the material property from the continuous design space and populating the grid cells in the physical domain with material property values;

in the physical domain, identifying connectivity of the prismatic grid cells across each fault by approaching the fault from both sides, wherein the identifying connectivity comprises computing intersections of cell faces from both sides of the fault; and using the model of the material property for hydrocarbon prospecting or reservoir development in the subsurface region.

2. The method of claim 1, wherein the faults and horizons are identified and the three-dimensional material property function is constructed at least partly from data acquired in a seismic survey of the subsurface region.

3. The method of claim 1, wherein the material property is one of rock type, permeability, porosity and any combination thereof.

4. The method of claim 1, wherein the piecewise smooth implicit or explicit function is a mathematical function that requires no grid for its definition.

5. The method of claim 1, wherein the method is applied zone-by-zone, one zone at a time, and further comprising consolidating grid geometries generated in each zone of the model by establishing connectivity of cells along contacts of zones including horizons and faults.

6. The method of claim 5, wherein the zones are defined by the horizons and faults.

7. The method of claim 1, wherein the material property contrasts are detected by vertically sampling the three-dimensional material property function along parallel rays.

8. The method of claim 1, wherein some of the prismatic cell faces are constructed to resolve surfaces of material property contrasts.

9. The method of claim 1, wherein the grid cells are truncated at faults, and the two-dimensional mesh is generated in an (x,y) plane of a bounding box around a volume part or an entire model volume, and the mesh is adapted to the material property or to density.

10. The method of claim 9, wherein the bounding box is fitted to the volume part or to the entire model volume by rotating the bounding box relative to an (x,y,z) coordinate system.

11. The method of claim 9, wherein the mesh extrusion is in a variable direction that depends on a gradient of the material property.

12. The method of claim 1, wherein the grid cells are truncated at faults and also at horizons.

13. The method of claim 1, wherein the grid cells are conformed at faults, the mesh is adapted to the material property or to density, and the extruding follows pillars of the parameterization.

14. The method of claim 1, wherein the grid cells are conformed at faults, and at horizons the grid cells are truncated or conformed.

15. The method of claim 1, wherein the property sampling uses the mapping from the physical domain to the design space.

16. The method of claim 1, wherein the two-dimensional mesh is generated in a plane of a bounding box around a volume part or an entire model volume, and the bounding box is fitted to the volume part or to the entire model by rotating the bounding box relative to an (x,y,z) coordinate system.

17. The method of claim 1, wherein the model is divided into a plurality of volume parts or fault blocks, and the mesh extrusion may vary with volume part or fault block.

18. The method of claim 17, wherein the mesh extrusion variation includes variation in extrusion direction, and the extrusion direction is determined by adapting to a material property gradient.

19. The method of claim 17, wherein each volume part or fault block may have its two-dimensional mesh in a different plane.

20. The method of claim 1, wherein the constructing grid layering from the function describing the material property is performed in the physical domain without relying on any grid from the design space.

21. The method of claim 1, wherein the two-dimensional mesh comprises a plurality of mesh cells, and wherein the direction for extruding the two-dimensional mesh through the physical domain into the third dimension is different for one or more of the plurality of mesh cells.

* * * * *